United States Patent
Wu

(10) Patent No.: US 8,248,692 B2
(45) Date of Patent: Aug. 21, 2012

(54) LENS MODULE WITH INFRARED-CUT FILTER AND INFRARED-PASS FILTER

(75) Inventor: Chia-Ying Wu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 386 days.

(21) Appl. No.: 12/564,712

(22) Filed: Sep. 22, 2009

(65) Prior Publication Data

US 2010/0134878 A1 Jun. 3, 2010

(30) Foreign Application Priority Data

Dec. 3, 2008 (CN) .......................... 2008 1 0305933

(51) Int. Cl.
*G02B 23/12* (2006.01)
*G02B 5/22* (2006.01)

(52) U.S. Cl. .................. 359/353; 359/350; 359/889
(58) Field of Classification Search .......... 359/350–361, 359/885–892
See application file for complete search history.

(56) References Cited

U.S. PATENT DOCUMENTS

| | | | | |
|---|---|---|---|---|
| 3,411,847 A * | 11/1968 | Barbieri | ........................... | 355/30 |
| 4,088,405 A | 5/1978 | Pustka et al. | | |
| 7,158,323 B2 * | 1/2007 | Kim et al. | ..................... | 359/892 |
| 2007/0189583 A1 * | 8/2007 | Shimada et al. | .............. | 382/118 |
| 2007/0291157 A1 * | 12/2007 | Ding et al. | ..................... | 348/360 |
| 2008/0151401 A1 * | 6/2008 | Chang | ............................ | 359/892 |

FOREIGN PATENT DOCUMENTS

| | | | | |
|---|---|---|---|---|
| CN | 2682447 | | 3/2005 | |
| JP | 2002-174839 | | 6/2002 | |
| JP | 2004-343614 | * | 12/2004 | ..................... 359/892 |

* cited by examiner

*Primary Examiner* — Thong Nguyen
(74) *Attorney, Agent, or Firm* — Altis Law Group, Inc.

(57) ABSTRACT

An exemplary lens module includes a barrel receiving a lens system therein, an infrared-cut filter, an infrared-pass filter, and a switching mechanism. The switching mechanism includes a connecting member interconnecting the infrared-cut filter and the infrared-pass filter, a first magnetic member fixed at the barrel, and a second magnetic member fixed at the connecting member. The first and second magnetic members are configured for driving the connecting member to move relative to the barrel so as to selectively bring either the infrared-cut filter or the infrared-pass filter into optical alignment with the lens system in the barrel.

18 Claims, 5 Drawing Sheets

LENS MODULE WITH INFRARED-CUT FILTER AND INFRARED-PASS FILTER

BACKGROUND

1. Technical Field

The present disclosure relates to lens modules, and particularly to a lens module that is capable of performing infrared and visible-spectrum photography.

2. Description of Related Art

Nowadays, camera modules are in widespread use. Camera modules are combined with various portable electronic devices such as mobile phones, personal digital assistants (PDAs) and other handheld computers so that the portable electronic devices are more multi-functional.

A typical camera module generally includes a lens module. The lens module is one of the major components of the camera module. The lens module is coupled with an image sensor such as a charge coupled device (CCD) or a complementary metal oxide semiconductor (CMOS) to capture images. Generally speaking, the image sensor reacts to light both in the visible spectrum and in the infrared spectrum. Light in the infrared spectrum can cause the image sensor's signal-to-noise ratio to be reduced when the lens module is used in natural light conditions for visible-spectrum photography. Therefore, an infrared-cut filter that blocks light in the infrared spectrum is fitted in the lens module to prevent such problem.

However, the lens module having an infrared-cut filter is only capable of performing visible-spectrum photography. Thus the functionality of the lens module is restricted to some extent. For example, such a lens module cannot ideally be used in dark environments for photography because of the lack of visible-spectrum light. Although infrared light is emitted by all objects all the time, even in dark environments, the lens module cannot be used for infrared photography due to infrared light being blocked by the infrared-cut filter.

What is needed, therefore, is a lens module that is capable of performing both infrared and visible-spectrum photography.

A lens module includes a barrel receiving a lens system therein, an infrared-cut filter, an infrared-pass filter, and a switching mechanism. The switching mechanism includes a connecting member interconnecting the infrared-cut filter and the infrared-pass filter, a first magnetic member fixed at the barrel, and a second magnetic member fixed at the connecting member. The first and second magnetic members are configured for driving the connecting member to move relative to the barrel so as to selectively bring either the infrared-cut filter or the infrared-pass filter into optical alignment with the lens system in the barrel.

Other advantages and novel features of the present invention will become more apparent from the following detailed description of embodiments when taken in conjunction with the accompanying drawings.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, all the views are schematic, and like reference numerals designate corresponding parts throughout the several views.

DETAILED DESCRIPTION

Various embodiments will now be described in detail below and with reference to the drawings.

Figure 1:
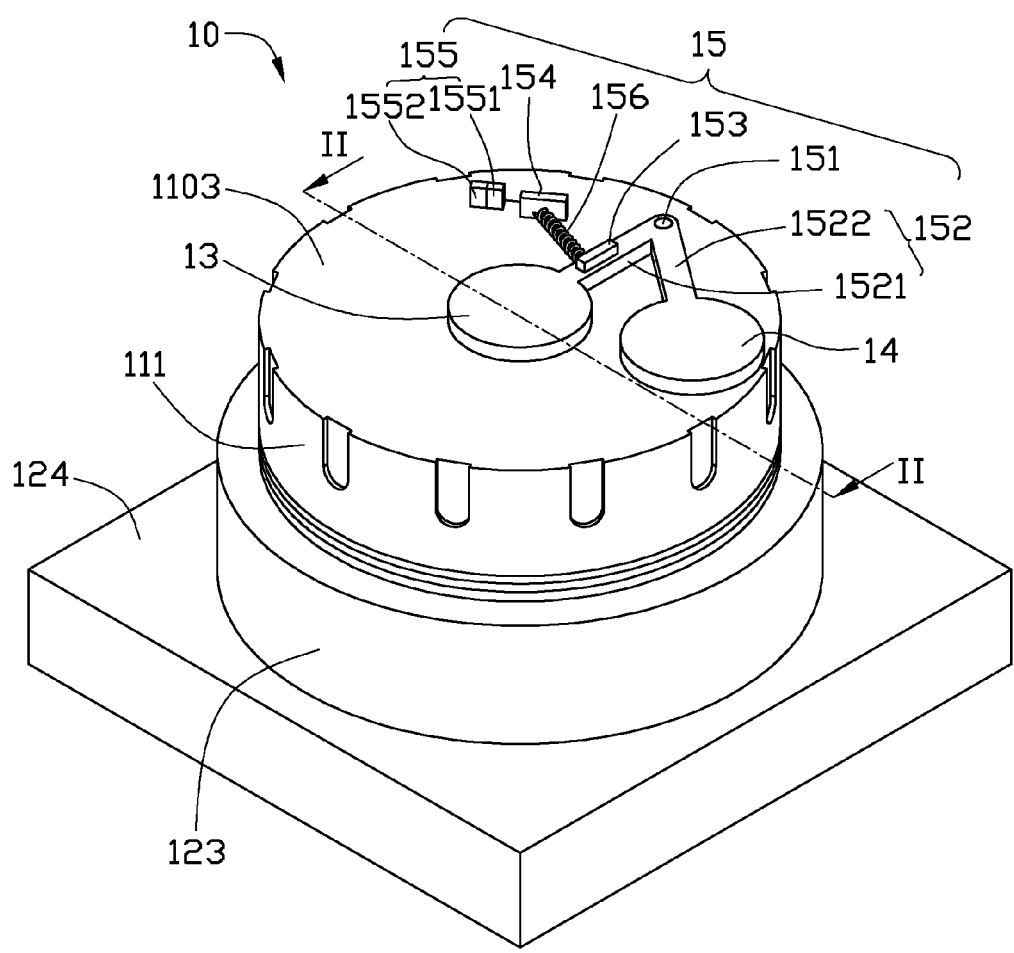
FIG. 1 is an isometric view of a lens module in accordance with a first embodiment, showing the lens module working in a daytime mode.
Figure 2:
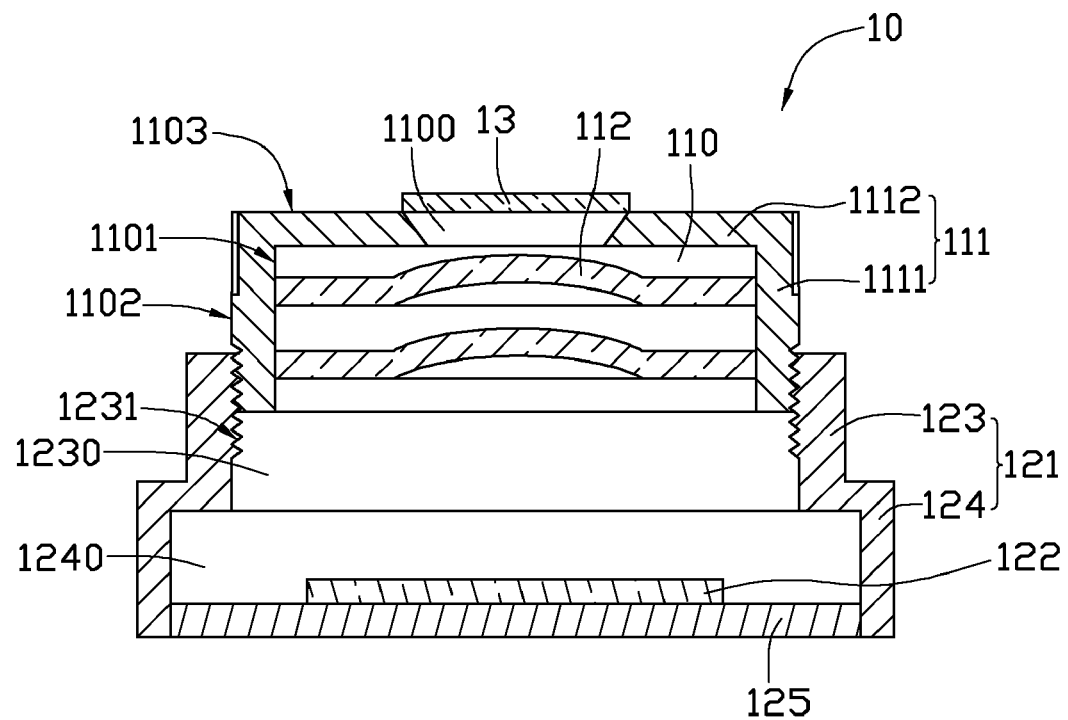
FIG. 2 is a sectional view of the lens module of FIG. 1, taken along line II-II thereof.
Figure 3:
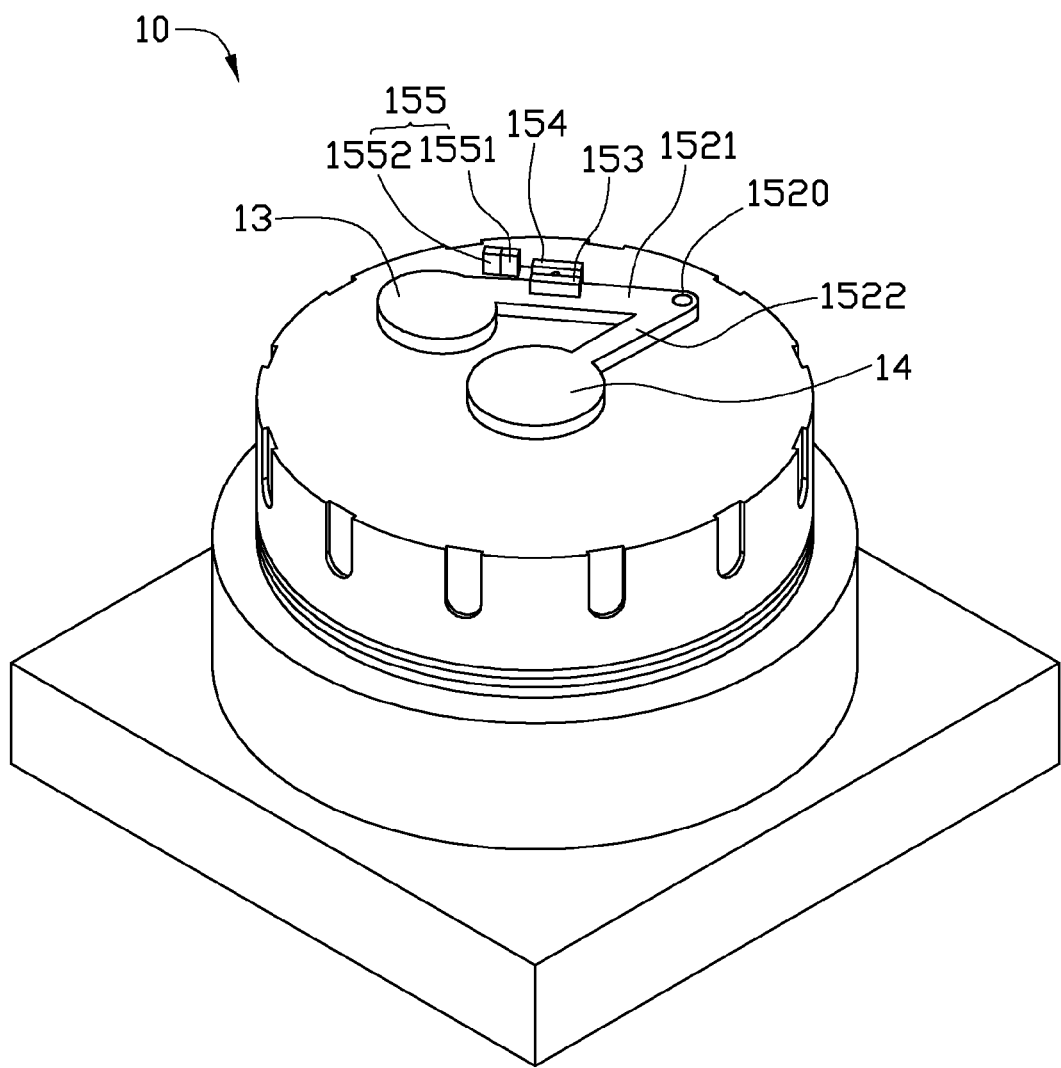
FIG. 3 is similar to FIG. 1, but showing the lens module working in a nighttime mode.

Referring to FIGS. 1 to 3, a lens module 10 in accordance with a first embodiment includes a barrel 111, a lens system 112, a holder 121, an image sensor 122, an infrared-cut filter 13, an infrared-pass filter 14, and a switching mechanism 15.

The barrel 111 is substantially in the form of a hollow cylinder. The barrel 111 includes an annular side wall 1111, and a top wall 1112 adjoining a top end of the side wall 1111. The side wall 1111 and the top wall 1112 cooperatively define a receiving space 110, which is configured for receiving the lens system 112. The side wall 1111 includes an inner surface 1101 and an outer surface 1102 at opposite peripheral sides thereof. The lens system 112 is received in the first receiving space 110 and is in contact with the inner surface 1101. Preferably, an optical axis of the lens system 112 is coaxial with a central axis of the barrel 111. A screw thread is defined at a bottom end of the outer surface 1102, and is configured for threadedly engaging with the holder 121. The top wall 1112 includes a top surface 1103 at the object side of the barrel 111, the top surface 1103 adjoining the outer surface 1102. The top wall 1112 defines a through hole 1100 at a central portion thereof. The through hole 1100 is in communication with the receiving space 110, for light to pass therethrough.

The holder 121 includes a first holding body 123 and a second holding body 124 adjoining each other. The first holding body 123 defines a first cavity 1230 therein, and includes an inner surface 1231 that bounds the first cavity 1230. The inner surface 1231 defines a screw thread, which corresponds to the screw thread on the outer surface 1102 of the barrel 111. Thereby, the barrel 111 can be partially screwed into the first cavity 1230 of the first holding body 123. The second holding body 124 defines a second cavity 1240 communicating with the first cavity 1230. The image sensor 122 is received in the second cavity 1240, at the image side of the barrel 111. The image sensor 122 is positioned to optically correspond to the lens system 112. The image sensor 122 is configured for capturing images defined by light refracted and focused thereon via the lens system 112, and producing electronic data representative of the captured images. Preferably, the image sensor 122 is mounted on a printed circuit board 125. The printed circuit board 125 is attached on an inner surface of the second holding body 124, and is located in the second cavity 1240.

The infrared-cut filter 13 is capable of blocking transmission of infrared light, and allowing visible light to transmit. The infrared-pass filter 14 is capable of blocking transmission of visible light, and allowing infrared light to transmit. The infrared-cut filter 13 and the infrared-pass filter 14 are both arranged at the top side of the barrel 111, far from the image sensor 122 at the bottom side of the barrel 111. Specifically, the infrared cut filter 13 and the infrared-pass filter 14 are positioned to abut and slidably contact the top surface 1103 of the barrel 111. The switching mechanism 15 is configured for driving the infrared-cut filter 13 and the infrared-pass filter 14 to move relative to the barrel 111 so as to selectively bring either the infrared-cut filter 13 or the infrared-pass filter 14 into optical alignment with the lens system 112 in the barrel 111. That is, the lens module 10 has two working modes, a daytime mode and a nighttime mode. Referring to FIG. 1, in the daytime mode, a central axis of the infrared-cut filter 13 is coaxial with the optical axis of the lens system 112. In other words, the infrared-cut filter 13 is in optical alignment with the lens system 112. Thus the lens module 10 is capable of performing visible-spectrum photography, for example in visible-light conditions or in bright environments. Referring to FIG. 3, in the nighttime mode, a central axis of the infrared-pass filter 14 is coaxial with the optical axis of the lens system 112. In other words, the infrared-pass filter 14 is in optical alignment with the lens system 112. Thus the lens module 10 is capable of performing infrared photography, for example in infrared conditions or in dark environments.

Specifically, the switching mechanism 15 includes a pivot pin 151, a connecting member 152, a first magnetic member 153, a second magnetic member 154, a processing unit 155, and an elastic member 156. The pivot pin 151 is cylindrical, and is fixed at the top surface 1103 of the barrel 111. The connecting member 152 includes a first connecting arm 1521 and a second connecting arm 1522 both perpendicular to a central axis of the pivot pin 151. Ends of the first and second connecting arms 1521, 1522 adjoin each other at the pivot pin 151, wherein an angle of approximately 60° is defined between the first and second connecting arms 1521, 1522. A pivot hole 1520 corresponding to the pivot pin 151 is defined in a joint portion of the first and second connecting arms 1521, 1522 where the ends of the first and second connecting arms 1521, 1522 adjoin each other. The pivot pin 151 is rotatably engaged in the pivot hole 1520 in a slip fit. Thereby, the connecting member 152 can rotate about the pivot pin 151 in a plane perpendicular to the central axis of the pivot pin 151. The infrared-cut filter 13 is fixed at an end of the first connecting arm 1521 opposite to the end where the pivot hole 1520 is defined. The infrared-pass filter 14 is fixed at an end of the second connecting arm 1522 opposite to the end where the pivot hole 1520 is defined. Thus, when the connecting member 152 rotates about the pivot pin 151, the infrared-cut filter 13 and the infrared-pass filter 14 can move relative to the top surface 1103 of the barrel 111.

The connecting member 152 can be driven to rotate under the operation of the first magnetic member 153, the second magnetic member 154, the processing unit 155, and the elastic member 156. The first magnetic member 153 is fixed to the connecting member 152. The first magnetic member 153 can in general be an electromagnet or a permanent magnet, and can be made of iron, cobalt, nickel or suitable alloys thereof. The second magnetic member 154 is fixed on the barrel 111. The second magnetic member 154 can in general be an electromagnet or a permanent magnet, and can be made of iron, cobalt, nickel or suitable alloys thereof. However, one of the first and second magnetic members 153, 154 must be an electromagnet, which is electrically connected with the processing unit 155. With such configuration, a magnetic force between the first and second magnetic members 153, 154 can be adjusted by the processing unit 155 via adjusting the current in the electromagnet.

In the illustrated embodiment, the first magnetic member 153 is a cuboid iron block, and is fixed on a central portion of the first connecting arm 1521. The second magnetic member 154 is a cuboid electromagnet, and is fixed on the top surface 1103 of the barrel 111. The second magnetic member 154 is positioned at one side of the first connecting arm 1521 opposite to the side where the second connecting arm 1522 is arranged. In other words, the first magnetic member 153 is arranged between and spaced a distance from the second magnetic member 154 and the second connecting arm 1522. A distance between the first magnetic member 153 and the pivot pin 151 is substantially equal to that between the second magnetic member 154 and the pivot pin 151.

The processing unit 155 includes a current-providing circuit 1551 integrated therein. The current-providing circuit 1551 is in electrical communication with the second magnetic member 154, and is configured for providing current to the second magnetic member 154. Thereby, the current-providing circuit 1551 adjusts and controls the magnetic field of the second magnetic member 154 to make the first and second magnetic members 153, 154 become attracted to each other or have no magnetic interaction. The processing unit 155 can be disposed at the barrel 111 or at the holder 121. In the illustrated embodiment, the processing unit 155 is fixed on the top surface 1103 of the barrel 111.

The elastic member 156 can be a coil spring, with one end connected with or around the first magnetic member 153 and the other end connected with or around the second magnetic member 154. In the illustrated embodiment, one end of the elastic member 156 is connected with the central portion of the first connecting arm 1521, and the other end of the elastic member 156 is connected with the second magnetic member 154.

The lens module 10 can selectively work in the daytime mode or the nighttime mode. When there is no current provided to the second magnetic member 154 by the current-providing circuit 1551 of the processing unit 155, there is no magnetic force generated between the first and second magnetic members 153, 154. Referring to FIG. 1, the infrared-cut filter 13 is in optical alignment with the lens system 112, and thus the lens module 10 works in the daytime mode. When a suitable current is provided to the second magnetic member 154 to generate a magnetic force attracting the first magnetic member 153 to the second magnetic member 154, the connecting member 152 is driven by the magnetic force to rotate clockwise about the pivot pin 151, and the infrared-cut filter 13 and the infrared-pass filter 14 move relative to the barrel 111 until the infrared-pass filter 14 is in optical alignment with the lens system 112. The elastic member 156 is thereby compressed, and the magnetic force and the restoring force (elastic potential energy) generated in the elastic member 156 balance each other out when the infrared-pass filter 14 is in optical alignment with the lens system 112. Thus, the lens module 10 works in the nighttime mode, as shown in FIG. 3.

When the processing unit 155 stops providing current to the second magnetic member 154, there is no magnetic force between the first and second magnetic members 153, 154 once again. Due to the restoring force of the elastic member 156, the connecting member 152 is driven to rotate counterclockwise about the pivot pin 151 and move away from the first magnetic member 153 until the infrared-cut filter 13 is brought into optical alignment with the lens system 112. That is, the lens module 10 is reverted to be in the daytime mode arrangement, as shown in FIG. 1.

Preferably, the processing unit 155 further includes a discriminating circuit 1552 interconnecting the current-providing circuit 1551 and the image sensor 122. The discriminating circuit 1552 is configured for providing trigger signals to the current-providing circuit 1551 by analyzing the brightness of images captured by the image sensor 122. When the images have a brightness less than a predetermined threshold value, the discriminating circuit 1552 provides a trigger signal to the current-providing circuit 1551 to make the lens module 10 work in the nighttime mode. When the images have a brightness larger than or equal to the predetermined threshold value, the discriminating circuit 1552 provides another trigger signal to the current-providing circuit 1551 to switch the lens module 10 to the daytime mode.

Figure 4:
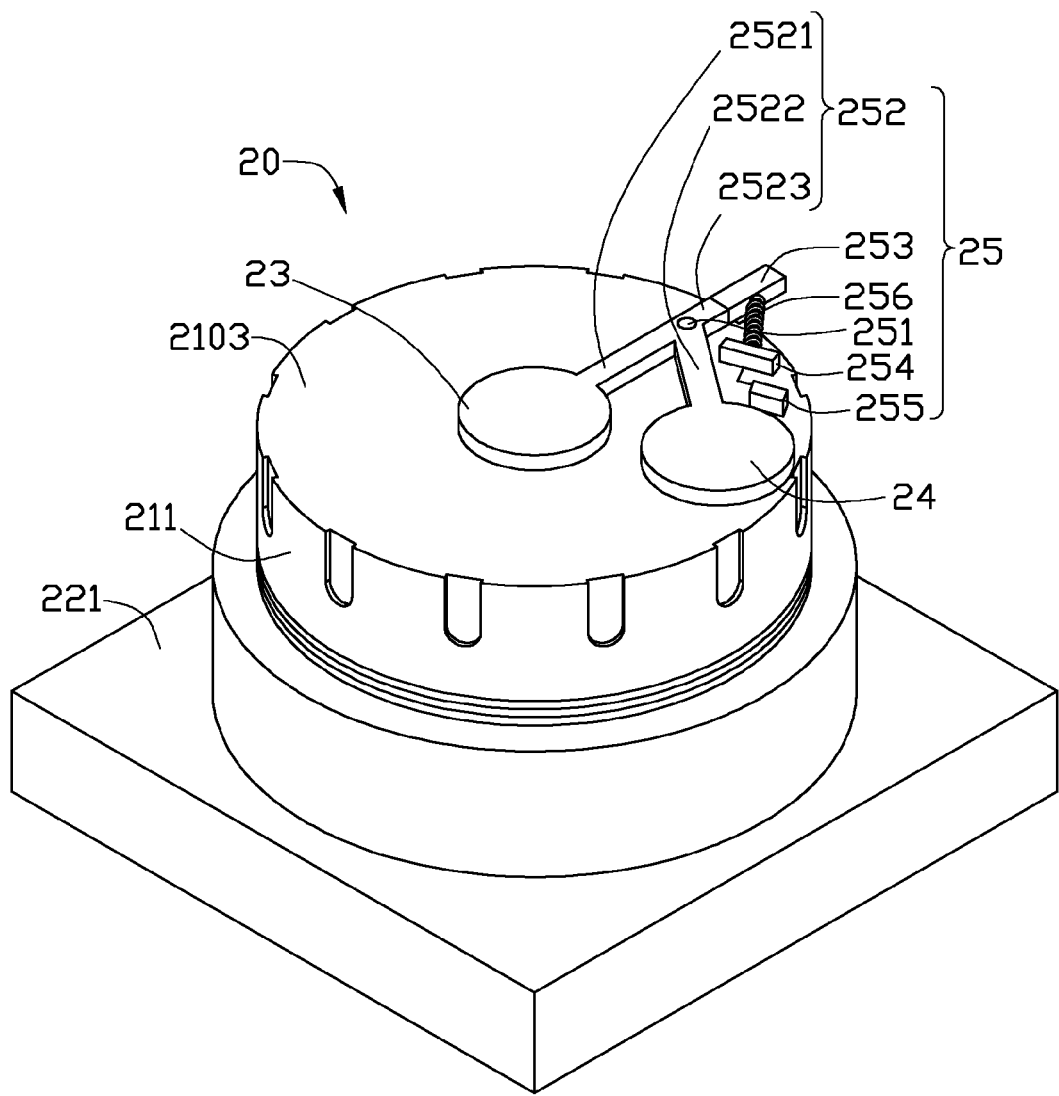
FIG. 4 is an isometric view of a lens module in accordance with a second embodiment.

Referring to FIG. 4, a lens module 20 in accordance with a second embodiment includes a barrel 211 receiving a lens system (not visible) therein, a holder 221 receiving an image sensor (not visible) therein, an infrared-cut filter 23, an infrared-pass filter 24, and a switching mechanism 25. The barrel 211, the lens system, the holder 221, the image sensor, the infrared-cut filter 23, and the infrared-pass filter 24 each have similar structures and arrangements to those of the barrel 111, the lens system 112, the holder 121, the image sensor 122, the infrared-cut filter 13, and the infrared-pass filter 14 of the lens module 10 of the first embodiment, respectively.

The switching mechanism 25 includes a pivot pin 251, a connecting member 252, a first magnetic member 253, a second magnetic member 254, a processing unit 255, and an elastic member 256. The pivot pin 251 is fixed on a top surface 2103 of the barrel 211. The connecting member 252 includes a first connecting arm 2521, a second connecting arm 2522, and a third connecting arm 2523. The first and second connecting arms 2521, 2522 adjoin each other at the pivot pin 251, and the pivot pin 251 is rotatably engaged in a joint portion of the first and second connecting arms 2521, 2522 where ends of the first and second connecting arms 2521, 2522 adjoin each other. The third connecting arm 2523 is aligned with the first connecting arm 2521, with the third connecting arm 2523 and the first connecting arm 2521 being located at opposite sides of the pivot pin 251. The infrared-cut filter 23 is fixed at an end of the first connecting arm 2521 opposite to the end where the pivot pin 251 is located. The infrared-pass filter 24 is fixed at an end of the second connecting arm 2522 opposite to the end where the pivot pin 251 is located. Thus, when the connecting member 252 rotates about the pivot pin 251, the infrared-cut filter 23 and the infrared-pass filter 24 can move relative to the top surface 2103 of the barrel 211.

The first magnetic member 253 is fixed to an end of the third connecting arm 2523 opposite to the end where the pivot pin 251 is located. The second magnetic member 254 is fixed on the top surface 2103 of the barrel 211, and is positioned between the third connecting arm 2523 and the second connecting arm 2522. In the present embodiment, the first magnetic member 253 is a permanent magnet, and the second magnetic member 254 is an electromagnet. The elastic member 256 is a coil spring. One end of the elastic member 256 is connected with the first magnetic member 253, and an opposite end of the elastic member 256 is connected with the second magnetic member 254.

The processing unit 255 has similar structure and function to that of the processing unit 155 of the lens module 10 of the first embodiment. However, the processing unit 255 can control magnetic force between the first and second magnetic members 253, 254 to make the first and second magnetic members 253, 254 become attracted to each other or repel each other. Thereby, the processing unit 255 can selectively bring either the infrared-cut filter 23 or the infrared-pass filter 24 into optical alignment with the lens system in the barrel 211. That is, the lens module 20 can selectively work in a daytime mode or a nighttime mode.

In FIG. 4, the infrared-cut filter 23 is in optical alignment with the lens system received in the barrel 211, and the lens module 20 is in the daytime mode. This position can be achieved by the processing unit 255 providing a suitable current to the second magnetic member 254 so as to generate a magnetic force causing repulsion between the first and second magnetic members 253, 254 and elongation of the elastic member 256. When the connecting member 252 has moved relative to the barrel 211 and reached a position of the daytime mode, the repulsion magnetic force and the restoring force (elastic potential energy) generated in the elastic member 256 balance out each other. When the processing unit 255 provides another suitable current to the second magnetic member 254 so as to generate another magnetic force causing attraction between the first and second magnetic members 253, 254 and compression of the elastic member 256, the connecting member 252 is driven to move relative to the barrel 211 until the infrared-pass filter 24 is in optical alignment with the lens system received in the barrel 211. In this position, the magnetic force and the restoring force (elastic potential energy) generated in the elastic member 256 balance out each other. Thus, the lens module 20 works in the nighttime mode.

Figure 5:
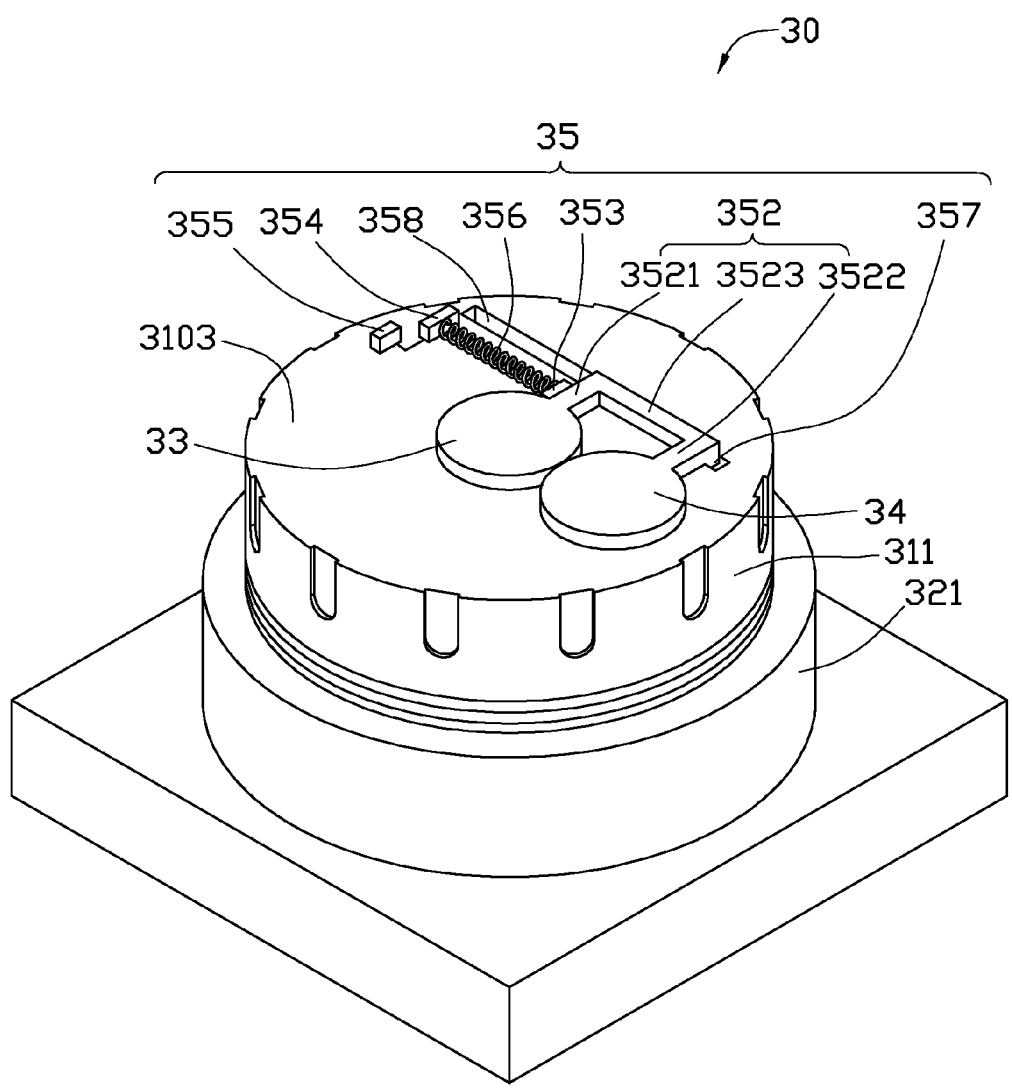
FIG. 5 is an isometric view of a lens module in accordance with a third embodiment.

Referring to FIG. 5, a lens module 30 in accordance with a third embodiment includes a barrel 311 receiving a lens system (not visible) therein, a holder 321 receiving an image sensor (not visible) therein, an infrared-cut filter 33, an infrared-pass filter 34, and a switching mechanism 35. The barrel 311, the lens system, the holder 321, the image sensor, the infrared-cut filter 33, and the infrared-pass filter 34 each have similar structure and arrangement to those of the barrel 111, the lens system 112, the holder 121, the image sensor 122, the infrared-cut filter 13, and the infrared-pass filter 14 of the lens module 10 of the first embodiment, respectively.

In the illustrated embodiment, the switching mechanism 35 can drive the infrared-cut filter 33 and the infrared-pass filter 34 in a sliding manner. Specifically, the switching mechanism 35 includes a connecting member 352, a sliding block 357 adjoining a bottom side of the connecting member 352, a sliding groove 358 defined in a top surface 3103 of the barrel 311, a first magnetic member 353, a second magnetic member 354, a processing unit 355, and an elastic member 356.

The connecting member 352 includes a first connecting arm 3521, a second connecting arm 3522 substantially parallel with the first connecting arm 3521, and a third connecting arm 3523 perpendicularly interconnecting the first and second connecting arms 3521, 3522. The infrared-cut filter 33 is fixed at an end of the first connecting arm 3521 opposite to the end where the third connecting arm 3523 adjoins the first connecting arm 3521. The infrared-pass filter 34 is fixed at an end of the second connecting arm 3522 opposite to the end where third connecting arm 3523 adjoins the second connecting arm 3522. Thus, the infrared-cut filter 33 and the infrared-pass filter 34 can move in unison with the connecting member 352. The sliding block 357 adjoins a bottom surface of the third connecting arm 3523, and is slidably received in the sliding groove 358. That is, the sliding block 357 can slide in the sliding groove 358. In other words, the sliding block 357, the connecting member 352, the infrared-cut filter 33 and the infrared-pass filter 34 can together move relative to the top surface 3103 of the barrel 311.

In the illustrated embodiment, the first magnetic member 353 is fixed on a side of the first connecting arm 3521. The second magnetic member 354 is fixed on the top surface 3103 of the barrel 311, and is generally opposite to the first magnetic member 353. Thus, the second magnetic member 354, the first magnetic member 353, the first connecting arm 3521, and the second connecting arm 3522 are substantially parallel to each other. The first connecting arm 3521 is in contact with the first magnetic member 353 and is positioned between the second connecting arm 3522 and the first magnetic member 353, and the first magnetic member 353 is positioned between first connecting arm 3521 and the second magnetic member 354. In the present embodiment, the first magnetic member 353 is an iron block, and the second magnetic member 354 is an electromagnet. The processing unit 355 has similar structure and function to that of the processing unit 155 of the lens module 10 of the first embodiment. In detail, the processing unit 355 is electrically connected with the second magnetic member 354, and is thereby capable of adjusting magnetic force between the first and second magnetic members 353, 354. In the illustrated embodiment, the elastic member 356 is a coil spring. The elastic member 356 extends along a direction parallel to the sliding groove 358. One end of the elastic member 356 is fixed to the first magnetic member 353, and the other end of the elastic member 356 is fixed to the second magnetic member 354.

In the illustrated embodiment, the lens module 30 can selectively work in a daytime mode or a nighttime mode. When the processing unit 355 does not provide any current to the second magnetic member 354, the infrared-cut filter 33 is in optical alignment with the lens system received in the barrel 311, and thus the lens module 30 is in the daytime mode. When the processing unit 355 provides a suitable current to the second magnetic member 354 so as to generate a magnetic force causing attraction between the first magnetic member 353 and the second magnetic member 354, the connecting member 352 is driven to move along the sliding groove 358 via the sliding block 357 until the infrared-pass filter 34 is in optical alignment with the lens system received in the barrel 311. In this state, the magnetic force between the first and second magnetic members 353, 354 is equal to the restoring force generated in the elastic member 356. Thus the lens module 30 works in the nighttime mode.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. A lens module, comprising:
   a barrel receiving a lens system therein;
   an infrared-cut filter;
   an infrared-pass filter; and
   a switching mechanism, comprising:
      a first magnetic member,
      a second magnetic member, and
      a connecting member interconnecting the infrared-cut filter and the infrared-pass filter;
   wherein the second magnetic member is fixed at the barrel, the first magnetic member is fixed at the connecting member and positioned generally opposite to the second magnetic member, and the first and second magnetic members are configured such that magnetic force can be selectively generated or absent therebetween to drive the connecting member to move relative to the barrel so as to selectively bring either the infrared-cut filter or the infrared-pass filter into optical alignment with the lens system in the barrel, the barrel has a top surface at an object side thereof, the second magnetic member is fixed at the top surface of the barrel, the connecting member is movably mounted to the barrel at the top surface, and the infrared-cut filter and the infrared-pass filter movably abut the top surface.

2. The lens module of claim 1, wherein one of the first and second magnetic members comprises an electromagnet, the switching mechanism further comprises a current-providing circuit electrically connected with the electromagnet, and the current-providing circuit is configured for providing current to the electromagnet thereby controlling the generation or absence of magnetic force between the first and second magnetic members.

3. The lens module of claim 2, further comprising an image sensor configured for capturing images defined by light refracted and focused thereon by the lens system, the switching mechanism further comprising a discriminating circuit electrically connected with the image sensor and the current-providing circuit, the discriminating circuit being configured for providing trigger signals to the current-providing circuit according to the brightness of images captured by the image sensor.

4. The lens module of claim 1, further comprising a holder engaged at an image side of the barrel and an image sensor received in the holder, the image sensor optically coupled to the lens system in the barrel and being configured for capturing images defined by light refracted and focused thereon by the lens system.

5. The lens module of claim 1, wherein the switching mechanism further comprises an elastic member, one end of the elastic member is fixed at the second magnetic member, and an opposite end of the elastic member is fixed at the first magnetic member or a portion of the connecting member adjacent to the first magnetic member.

6. The lens module of claim 1, wherein the connecting member defines a pivot hole therein, and the switching mechanism further comprises a pivot pin fixed at the barrel and engaged in the pivot hole such that the connecting member is rotatable relative to the barrel about the pivot pin.

7. The lens module of claim 6, wherein the connecting member comprises a first connecting arm and a second connecting arm adjoining each other at an acute angle, the pivot hole is defined at a joint portion of the first and second connecting arms, the infrared-cut filter is fixed at an end of the first connecting arm opposite to the end where the pivot hole is defined, and the infrared-pass filter is fixed at an end of the second connecting arm opposite to the end where the pivot hole is defined.

8. The lens module of claim 7, wherein the first magnetic member is fixed at the first connecting arm, and the first connecting arm is positioned between the second magnetic member and the second connecting arm.

9. The lens module of claim 8, wherein the connecting member further comprises a third connecting arm aligned with the first connecting arm, with the third connecting arm and the first connecting arm being located at opposite sides of the pivot pin, the first magnetic member is fixed at the third connecting arm, and the second connecting arm is positioned between the first connecting arm and the second magnetic member.

10. The lens module of claim 1, wherein the barrel defines a sliding groove, the connecting member comprises a sliding member slidably engaged in the sliding groove such that the connecting member is slidable relative to the barrel along the sliding groove.

11. The lens module of claim 10, wherein the barrel has a top surface at an object side thereof, and the sliding groove is defined in the top surface.

12. The lens module of claim 10, wherein the connecting member further comprises a first connecting arm, a second connecting arm substantially parallel to the first connecting arm, and a third connecting arm interconnecting the first and second connecting arms, the sliding member is at a bottom side of the third connecting arm, the infrared-cut filter is fixed at an end of the first connecting arm opposite to the end where the third connecting arm is located, and the infrared-pass filter is fixed at an end of the second connecting arm opposite to the end where the third connecting arm is located.

13. The lens module of claim 12, wherein the first magnetic member is fixed at the first connecting arm and is positioned between the second magnetic member and the second connecting arm.

14. The lens module of claim 13, wherein the switching mechanism further comprises an elastic member interconnecting the first and second magnetic members, and a longways direction of the elastic member is substantially parallel to the sliding groove.

15. A lens module, comprising:
a barrel receiving a lens system therein;
an infrared-cut filter;
an infrared-pass filter; and
a switching mechanism, comprising:
a first magnetic member,
a second magnetic member, and
a connecting member interconnecting the infrared-cut filter and the infrared-pass filter;
wherein the second magnetic member is fixed at the barrel, the first magnetic member is fixed at the connecting member and positioned generally opposite to the second magnetic member, and the first and second magnetic members are configured for generating magnetic force therebetween to drive the connecting member to move relative to the barrel so as to selectively bring either the infrared-cut filter or the infrared-pass filter into optical alignment with the lens system in the barrel, the barrel has a top surface at an object side thereof, the second magnetic member is fixed at the top surface of the barrel, the connecting member is movably mounted to the barrel at the top surface, and the infrared-cut filter and the infrared-pass filter movably abut the top surface.

16. The lens module of claim 15, wherein one of the first and second magnetic members comprises an electromagnet, the switching mechanism further comprises a current-providing circuit electrically connected with the electromagnet, and the current-providing circuit is configured for providing current to the electromagnet thereby controlling the generation of attraction magnetic force or repulsion magnetic force between the first and second magnetic members.

17. The lens module of claim 15, wherein the switching mechanism further comprises an elastic member, one end of the elastic member is fixed at the second magnetic member, and an opposite end of the elastic member is fixed at the first magnetic member or a portion of the connecting member adjacent to the first magnetic member.

18. A lens module, comprising:
a barrel with a lens system received therein;
an infrared-cut filter;
an infrared-pass filter; and
a switching mechanism, comprising:
a first magnetic member,
a second magnetic member, and
a connecting member interconnecting the infrared-cut filter and the infrared-pass filter;
wherein the second magnetic member is fixed at the barrel, the first magnetic member is fixed at the connecting member and positioned generally opposite to the second magnetic member, at least one of the first and second magnetic members is an electromagnet capable of generating magnetic force between the first and second magnetic members when electrified and capable of achieving a state of no magnetic force between the first and second magnetic members when not electrified to drive the connecting member to move relative to the barrel between a first position and a second position, wherein at the first position the infrared-cut filter is in optical alignment with the lens system such that the lens module is capable of capturing visible light images, and at the second position the infrared-pass filter is in optical alignment with the lens system such that the lens module is capable of capturing infrared light images, the barrel has a top surface at an object side thereof, the second magnetic member is fixed at the top surface of the barrel, the connecting member is movably mounted to the barrel at the top surface, and the infrared-cut filter and the infrared-pass filter movably abut the top surface.

* * * * *